(12) United States Patent
Mobley et al.

(10) Patent No.: US 6,880,862 B2
(45) Date of Patent: Apr. 19, 2005

(54) CONDUCTIVE TUBULAR INSERT FOR A FUEL TRANSPORT SYSTEM, AND METHOD

(75) Inventors: John E. Mobley, Lexington, TN (US); Christopher W. Smith, Lexington, TN (US); Jay T. Butler, Lexington, TN (US); Jerry Shifman, Wildersville, TN (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/410,973

(22) Filed: Apr. 10, 2003

(65) Prior Publication Data

US 2004/0201217 A1 Oct. 14, 2004

(51) Int. Cl.$^7$ ................................................ F16L 55/00
(52) U.S. Cl. ........................ 285/238; 285/260; 285/53; 285/253; 439/190; 174/19
(58) Field of Search ................................. 285/238, 239, 285/253, 260, 53; 137/592, 593; 439/190; 174/19

(56) References Cited

U.S. PATENT DOCUMENTS

| | | | | |
|---|---|---|---|---|
| 140,374 | A | * 7/1873 | Kennedy | 285/249 |
| 1,200,798 | A | * 10/1916 | Bennett | 285/334.2 |
| 3,087,747 | A | * 4/1963 | Novotny | 285/398 |
| 3,837,686 | A | * 9/1974 | Powell | 285/55 |
| 5,143,122 | A | * 9/1992 | Adkins | 138/109 |
| 6,089,278 | A | 7/2000 | Nishino et al. | |
| 6,203,873 | B1 | * 3/2001 | Shifman et al. | 428/36.8 |
| 6,365,250 | B1 | * 4/2002 | Shifman et al. | 428/36.8 |
| 6,409,225 | B1 | 6/2002 | Ito | |
| RE37,775 | E | * 7/2002 | Martucci | 174/47 |
| 6,568,714 | B1 | * 5/2003 | Stripe | 285/253 |
| 6,591,871 | B1 | * 7/2003 | Smith et al. | 138/137 |
| 6,612,621 | B1 | * 9/2003 | Oberheide et al. | 285/252 |
| 6,652,939 | B1 | * 11/2003 | Smith et al. | 428/35.9 |
| 6,679,297 | B1 | * 1/2004 | Nishi et al. | 138/137 |
| 2002/0096882 | A1 | * 7/2002 | Stripe | 285/253 |

* cited by examiner

Primary Examiner—Eric K. Nicholson
(74) Attorney, Agent, or Firm—Joseph V. Tassone; J. Daniel Lykins

(57) ABSTRACT

A conductive tubular connector insert for use in a fuel conveying system to couple a first conductive polymeric tubular member to a second conductive polymeric tubular member such that electrical conductivity is insured in the system as described. The conductive tubular connector comprises: a first end having a first annular margin; a second end having a second annular margin; a first tubular body section having a first circumference; a second tubular body section having a second circumference; and an annular rib, wherein the first tubular body section is adjacent the first end and extends toward the annular rib along a longitudinal axis, and the second tubular body section extends from the annular rib toward the second end where, at a point intermediate the circumferential rib and the second end, the second tubular body section tapers radially inward forming a tapered surface terminating in a second annular margin adjacent the second end of the second tubular body section, the configuration of the conductive connector insert being such that, upon being implanted into an end of the first polymeric tubular member, the end of the first polymeric tubular structure forms a bead around the annular rib to secure the conductive connector insert therein leaving a portion of the second tubular body section extending out of the end of the first polymeric tubular member, wherein the end of the first polymeric tubular structure having the second tubular body section extending therefrom is inserted into an end of a second polymeric tubular member such that the conductive connector insert is in conductive contact with the conductive inner surface of the first polymeric tubular member and the conductive inner surface of the second polymeric tubular member to maintain conductive continuity therein.

29 Claims, 2 Drawing Sheets

CONDUCTIVE TUBULAR INSERT FOR A FUEL TRANSPORT SYSTEM, AND METHOD

BACKGROUND OF THE INVENTION

The present invention relates generally to coupling means for connecting plastic tubing to the open end of a hose. More particularly, the invention relates to conductive tube insert for coupling a plastic tubular member having a conductive inner layer to a rubber hose having a conductive inner layer such that conductive continuity is maintained between the conductive inner layer of the plastic tubular member and the conductive inner layer of the rubber hose.

Hose assemblies for transporting various fluids in vehicles, machinery, etc. are known. For installing a fuel transport tube, for example, between the metal funnel and the fuel tank in an automotive vehicle, a metal tubular member is connected to the fuel tank by means of a rubber hose which has a conductive inner surface so that there is conductive continuity in the entire fuel filler line to avoid the generation of static electricity due to the flow of fuel through the fuel filler tube. Often it is desirable or necessary to replace the metal tubular member with, e.g., a plastic tube or other tube of a different construction or to a hose such as a rubber hose. When a plastic tube is used to replace the metal tubular member, it is necessary that the inner layer of the plastic tube be made conductive to avoid the generation of static electricity. When the plastic tube is connected to the rubber hose, conductive continuity no longer exists because the conductive inner layer of the rubber hose is not in contact with the conductive inner layer of the plastic tube, but is in contact with the non-conductive outer layer of the plastic tube. Since the tubular structure transporting the fuel is required to have a high degree of fuel impermeability as well as being electrically conductive, it is difficult to provide a plastic tube which is made solely of an electrical conductive resin. Therefore, plastic fuel tubes are required to include not only an inner layer of an electrically conductive material, but also one or more other layers which provide the necessary fuel impermeability. Furthermore, it is necessary that the plastic tube have an outer protective layer made of nylon, chlorinated polyethylene, etc. Therefore, there is a need in the industry for a fuel transport tubular system which exhibits the desirable physical characteristics of a plastic tubular member and which also meets the electrical conductive continuity required for such fuel transport tubular system.

SUMMARY OF THE INVENTION

The present invention relates to a fuel transport system which meet the requirement that the system maintain electrical conductive continuity in the fuel transport line between the fuel intake funnel and the fuel tank, while exhibiting the desirable physical characteristics associated with plastic materials.

It is therefore an object of the invention to provide a fuel transport system comprising a plastic fuel tube having a conductive inner layer, connected to a rubber hose having a conductive inner layer, in a fuel fill system for conveying fuel from a fuel source through a fuel fill funnel to a fuel tank, wherein conductivity is maintained between the conductive inner layer of the plastic tubular member and conductive inner layer of the rubber hose.

It is another object of the invention to provide connecting means for connecting the plastic fuel tube having an inner electrical conductive layer, to a rubber hose having an inner electrical conductive layer, wherein continuity of the electrical conductivity is maintained while preserving the fuel impermeability of the plastic tubular member.

It is still another object of the invention to provide a method for maintaining electrical conductivity between a plastic tubular member having an inner conductive surface, and a rubber hose having an inner conductive surface.

The use of plastic tubes in the transport of fuel in automotive vehicles is generally preferred over metal tubes because, among other reasons, plastic tubes resist corrosion, are more economical than metal and they inherently possess "shock absorber" characteristics which make plastic tubes less prone to leaks.

According to the invention, a polymeric tubular fuel transport member having an electrically conductive inner layer is installed between the fuel intake funnel of an automotive vehicle and one end of a polymeric hose having an electrically conductive inner surface, the other end of the polymeric hose being secured to the fuel tank. An electrically conductive insert connector is employed to connect the polymeric tubular fuel transport member to the polymeric hose so that electrical continuity is maintained between the fuel transport hose and the polymeric hose. In a preferred aspect of the invention, one end of the conductive insert connector is inserted into an open end of the plastic tubular member such that the other end of the electrically conductive insert connector extends outward beyond the open end of the fuel transport tubular member. The polymeric hose which preferably has an inner diameter equal to or slightly larger than the outer circumference of the polymeric tubular fuel transport member is forced over the other end of the conductive insert connector and then over the end of the polymeric tubular fuel transport member having the conductive insert connector therein, such that the extended portion of the electrically conductive insert connector is in intimate contact with both the inner conductive layer of the polymeric tubular fuel transport member and the inner conductive layer of the polymeric hose, thereby providing continuity of the electrical conductivity between the plastic tubular member and the rubber hose while, at the same time, allowing the connection between the polymeric tubular fuel transport member and the polymeric hose to be securely effected by securing means, e.g., clamping means, such as a spring clamp or screw clamp, to prevent pull-off. By way of the present invention, the continuity of the required electrical conductivity in the fuel filler system between the entrance of the fuel into the polymeric fuel transport tubular member and the polymeric hose, and the exit of the fuel into the fuel tank is maintained.

The electrically conductive insert connector may be manufactured from any material which possesses the necessary electrical conductivity. Typically, the electrically conductive insert connector is made from metal or a plastic material which has electrical conductivity throughout, from the inner most layer to the outer most layer. More specifically, the conductive connector insert of the present invention has a robust tubular shape wherein the connector is configured to allow the connector insert to seat in the tube member to form a bead which prevents leaking as well as providing improved pull-off forces.

DETAILED DESCRIPTION OF THE INVENTION

Figure 1:
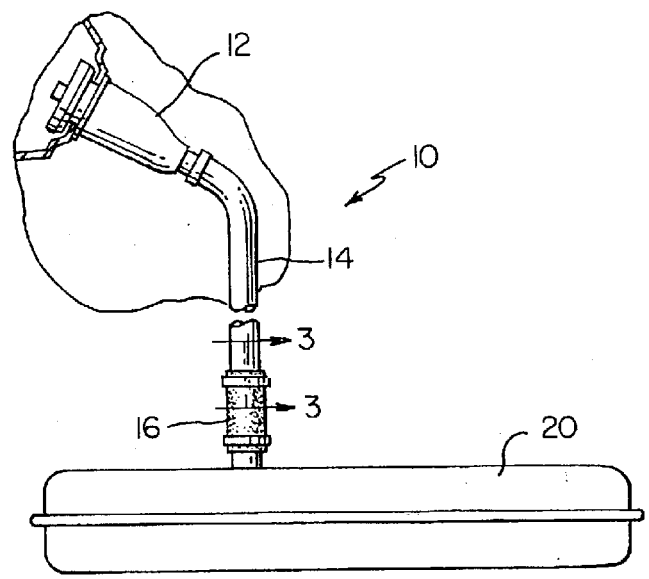
FIG. 1 is an elevational sectional view of a fuel fill system for conveying fuel between a fuel fill funnel and a fuel tank of an automotive vehicle.

Referring to the drawings, FIG. 1 illustrates one aspect of the invention where a fuel fill tube assembly 10 includes a fuel funnel 12, a first polymeric tubular member 14 which is preferably a thermoplastic material, a second polymeric tubular member 16 which is preferably a rubber material, a conductive connector insert 18 (FIG. 3) connecting the first polymeric tubular member 14 to the second polymeric tubular member 16, and a fuel tank 20. The first polymeric tubular member 14, hereinafter referred to as a plastic or thermoplastic member, includes at least a conductive inner surface 22 and a non-conductive outer surface 24, and the second polymeric tubular member 16, hereinafter referred to as a rubber member, includes at least a conductive inner surface 26 and a non-conductive outer surface 28. In accordance with the invention, the plastic tubular member 14 and the rubber tubular member 16 are connected to each other by the conductive connector 18 such that conductive continuity is maintained between the conductive inner surface 22 of the plastic tubular member 14 and the conductive inner surface 26 of the rubber tubular member 16. Electrical conductivity continuity along the path of the fuel conveyed in a fuel carrying structure is necessary to dissipate any static electrical charge generated by the flow of the fuel in the carrying structure.

According to another embodiment of the invention, conductive continuity is maintained in a fuel conveying pipe by a method employing the steps of:

providing a first plastic tubular member 14 having a first conductive inner surface;

providing a second rubber tubular member 16 having a second conductive inner surface, the second rubber tubular member 16 has an inner diameter equal to or greater than the outer diameter of the first plastic tubular member 14 so that the first plastic tubular member 14 can be partially inserted into the second rubber tubular member 16; and providing a conductive connector insert 18 for connecting said first polymeric tubular member 14 to said second polymeric tubular member 16, said conductive connector insert 18 comprising; a conductive tubular body member including a first end 32 having a first annular margin 34, and a second end 36 having a second annular margin 38, the configuration of said conductive tubular connector insert 18 being such that, upon being employed to couple a first conductive polymeric tubular member 14 to a second conductive polymeric tubular member 16, conductive continuity is maintained between the first conductive polymeric member 14 and the second conductive polymeric member 16; and Interconnecting the two tubular members together using a conductive connector insert 18, said conductive connector insert comprising a conductive tubular body member including a first end having a first annular margin, and a second end having a second annular margin, the configuration of said conductive tubular connector insert being such that, upon being employed to couple a first conductive polymeric tubular member to a second conductive polymeric tubular member, conductive continuity is maintained between the first conductive polymeric member and the second conductive polymeric member.

In a preferred aspect of this embodiment of the invention, the conductive connector insert 18 comprises:

(a) a first end 32 having a first annular margin 34;

(b) a second end 36 having a second annular margin 38; and (c) a first tubular body member 40 having a first substantially uniform circumference; and (d) a second tubular body member 42 having a second substantially uniform circumference. The first tubular body member 40 is adjacent the first end 32 and extends toward second end 36 along a longitudinal axis A. At an intermediate point along the longitudinal axis A, first tubular body member flares radially outward forming a circumferential rib 44 and at a maximum circumference, the rib 44 tapers radially inward forming the second tubular body member 42. At a point intermediate the circumferential rib 44 and the second end 36, the second tubular body member tapers radially inward forming a tapered surface 50 terminating in a second annular margin 38 adjacent the second end 36 of the second tubular body member 42. The configuration of the conductive connector insert 18 is such that, upon being implanted into an end of the plastic tubular member 14, the plastic tubular member 14 forms a bead around the annular rib 44 to secure the conductive connector insert 18 therein, while the second tubular body member 42 extends out of the end of the plastic tubular member 14. The end of the plastic tubular member having the second tubular body member 42 extending therefrom is then inserted into an end of the rubber tubular member 16 such that the conductive connector insert 18 is in conductive contact with both the conductive inner surface of the first tubular member 14 and the conductive inner surface of the second tubular member 16 to maintain conductive continuity in the fuel conveying assembly 10, thereby preventing static buildup which can normally occur in a non-conductive tubular fuel system.

Figure 3:
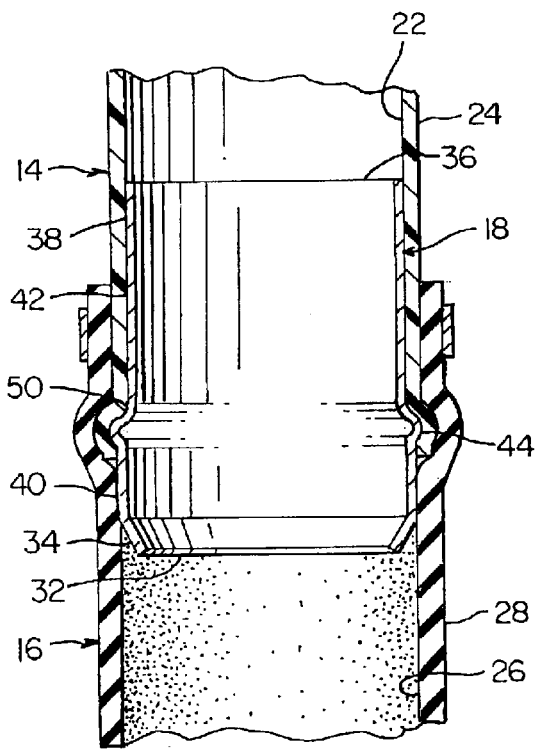
FIG. 3 is a cross-sectional view of a section of the fuel fill system of FIG. 1 taken along lines 3—3 showing the conductive connector insert of the present invention.

Still another aspect of the present invention is the conductive connector insert employed in the fuel fill system. As illustrated in FIG. 3, one end of a conductive connector insert 18 is inserted into one end of the plastic tubular member 14 to a point where only a portion of the conductive connector insert 18 is implanted within the plastic tubular member 14. Typically, the conductive connector insert will be installed into an end of the plastic tubular member 14 to a point immediately beyond the annular rib 32 on the second tubular body member 42 of the conductive connector insert 18. The installation of the conductive connector insert 18 into the plastic tubular member may be temporary or permanent.

Figure 2:
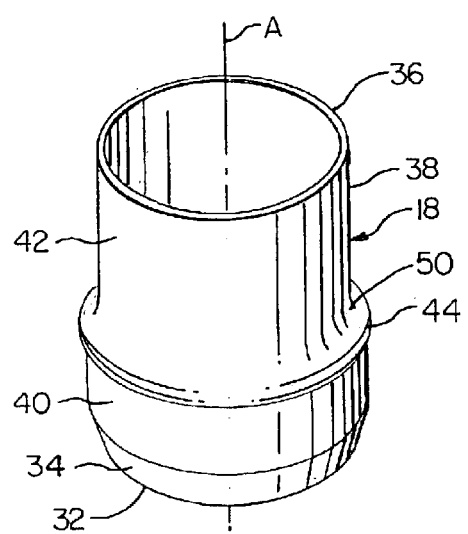
FIG. 2 is a perspective view of a connector insert of the present invention.

The conductive connector insert 18 can be more readily appreciated by viewing FIGS. 2 and 3 where the conductive connector insert 18 includes a first end 32 having a first annular margin 34, a second end 36 having a second annular margin 38, and a tubular body member 40 extending along a longitudinal axis between end 32 of the insert 18 and the annular rib 44. The second tubular body member 42 extends from the annular rib 44 in the direction of end 36 of the insert 18. Near the end 36 of the conductive connector insert 18, the second tubular body member 42 tapers inwardly toward the second margin 38 of the conductive connector insert 18, forming the tapered surface 50 which terminates in the second annular margin 38.

Figure 4:
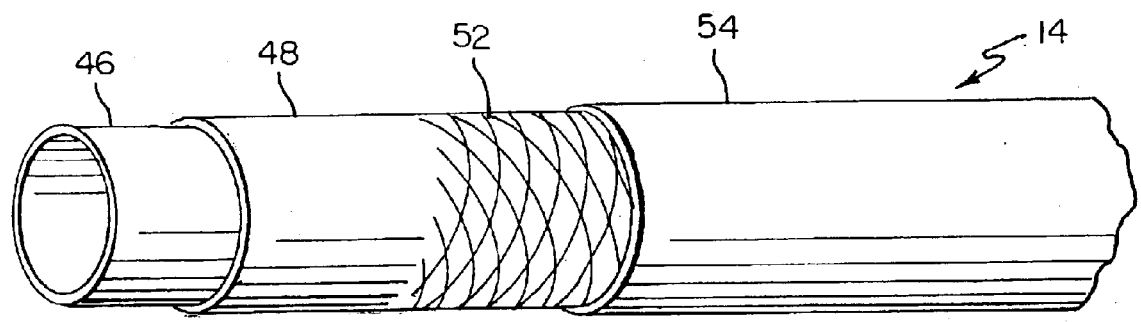
FIG. 4 is a perspective view of a plastic tubular member useful in the present invention.

FIG. 4 illustrates the construction of a typical plastic tubular member in accordance with the present invention wherein the plastic tubular member 14 includes an inner conductive layer 46, a barrier layer 48, an optional reinforcing layer 52 and a cover layer 54. Typically, the inner conductive layer is a molded or extruded plastic material selected from the group consisting of nitrile polymers, polyolefins, polyesters, polyamides, polyamides, polyimides, polysulfones, polycarbonates, fluoro polymers, silicone polymers, polyurethanes, polyalkyleneterephthalates, and combinations thereof. Nitrile polymers, e.g., acrylonitrile-butadiene polymer has been found to be particularly effective as the inner conductive layer, but any of the materials conventionally used as a conductive plastic layer in a fuel tube can be employed as the inner conductive layer.

The second layer adjacent the first layer is typically formed from a material which exhibits the necessary characteristics needed to meet the requirements for a barrier layer in a fuel tube. Examples of such materials include polyolefins such as polyethylene, polypropylene polybutene-1, polyallylate, polyethylene terephthalate, polybutylene terephthalate, polyoxybenzolyl, etc.; nylons such as nylon 6, nylon 66, nylon 11, nylon 12, nylon 4, nylon 6/66, nylon 6/10, nylon 6/12, etc.; polyamides such as aromatic polyamides; polyethers such as polyacetal, polyphenylene oxide, polyether ether ketone, polyphenylene sulfide, etc.; polysulfones such as polyether sulfone, etc.; polyimides such as polyether imides, polyamide imides, polybismaleimides, etc., polycarbonate, fluoro resins such as polyvinyl fluoride, polyvinylidene fluoride polytrifluoromonochloroethylene, etc.; various copolymers and terpolymers such as tetrafluoroethylene-hexafluoropropylene-vinylidene fluoride terpolymers copolymers, hexafluoropropylene-tetrafluoroethylene copolymers, and perfluoroalkoxytetrafluoroethylene copolymers; and thermoplastic urethane, polyvinyl chloride, polyvinylidene chloride, vinyl chloride/vinylidene chloride copolymers, crosslinked vinyl chloride resins, silicon resins, polyurethanes, and the like. These resins may be used alone or as a blend of two or more of the foregoing resins. Also employable are a blend of such a resin with another polyolefin and a blend of such a resin with an elastomer such as rubber. Fluoroplastic terpolymers such as tetrafluoroethylene-hexafluoropropylene-vinylidene fluoride terpolymers have been found to provide good properties for use as a barrier layer in the plastic tubular members 14. Such fluoro terpolymers are available from Dyneon under the name THV. Blends of fluoro plastic terpolymers and fluoro elastomeric terpolymers are also useful in the present invention as a barrier layer in the plastic tubular members 14. Such fluoro polymers may also be made conductive and used as the conductive layer in the present plastic tubular members 14. The barrier layer can also be formed of a metallic material such as steel, aluminum, brass, copper, and the like. The metallic material may be in the form of a thin sheet, thin wrapping, or the metallic material may be dispersed as a fine powder in a polymeric material.

Also useful are composite plastic materials comprising any of the foregoing resins and a reinforcement in the form of highly stiff inorganic fibers such as glass fibers, carbon fibers, boron fibers, silicon carbide and organic fibers such as Kevlar, an aromatic polyamide. The reinforcement may also be employed separately as an optional reinforcing layer between the barrier layer and the cover layer or between the conductive layer and the barrier.

The cover layer may be any of the conventional materials used in the art such as polyethylene terephthalate, chlorinated polyethylene, and the like. Preferably, the cover layer is a chlorinated polyethylene.

Figure 5:
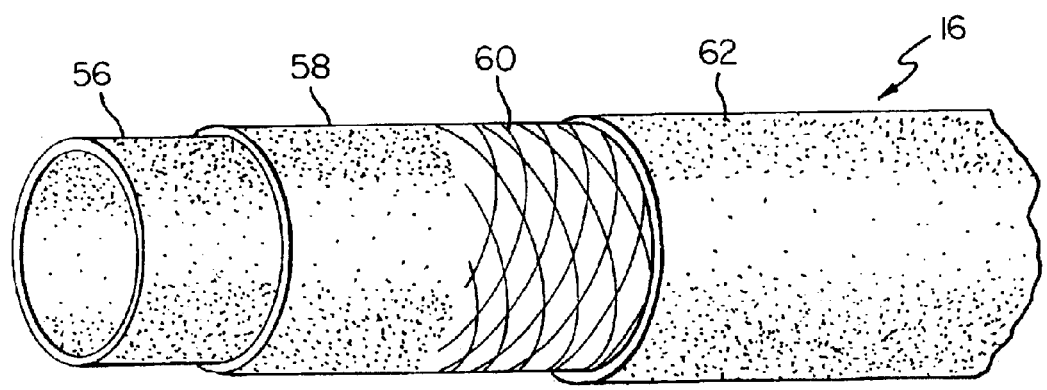
FIG. 5 is a perspective view of a rubber tubular member useful in the present invention.

FIG. 5 illustrates the construction of a typical rubber tubular member in accordance with the present invention wherein the rubber tubular member 16 includes an inner conductive layer 56, a barrier layer 58, an optional reinforcing layer 60 and a cover layer 62. The rubber tubular member 16 of the present invention includes natural and synthetic rubbers. Examples of the synthetic rubber used herein include homopolymers of conjugated dienes such as isoprene, butadiene, and chloroprene, for example, polyisoprene rubber, polybutadiene rubber, and polychloroprene rubber; copolymers of the conjugated dienes with vinyl compounds such as styrene acrylonitrile vinylpyridine, acrylic acid, methacrylic acid, alkyl acrylates, and alkyl methacrylates, styrene-butadiene copolymer rubber, vinyl-pyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of olefins such as ethylene, propylene and isobutylene with diene compounds, for example, isobutylene-isoprene copolymer rubber; copolymers of olefins with nonconjugated dienes (EPDM), for example, ethylene-propylene-cyclopentadiene terpolymers, ethylene-propylene-5-ethylidene-2-norbornene terpolymers, and ethylene-propylene-1,4-hexadiene terpolymers; polyalkenamers obtained by ring opening polymerization of cycloolefins, for example, polypentanamer; rubbers obtained by ring opening polymerization of oxysilane rings, for example, sulfur-vulcanizable polyapichlorohydrin rubber, and polypropylene oxide rubber. Halogenated products of the foregoing rubbers are also employable, for example, chlorinated isobutylene-isoprene copolymer rubber and brominated isobutylene-isoprene copolymer rubber. Also included are homopolymers, copolymers and terpolymers of hexafluoropropylene, tetrafluomoethylene, and vinylidene fluoride, and blends thereof. Ring opened polymers of norbomene may be used. Further useful are rubber blends, for example, blends of the foregoing rubbers with saturated elastomers such as epichlorohydrin rubber, hydrogenated, nitrile rubber, polypropylene oxide rubber, and chlorosulfonated polyethylene. The thickness of the hose which may include one or more layers is consistent with those hoses commonly used in similar applications.

An outer cover layer also may be employed over the rubber tubular member. Where the cover layer is used with the rubber layer, it is typically any of the conventional materials used in the art such as polyethylene terephthalate, chlorinated polyethylene, and the like. Preferably, the cover layer is a chlorinated polyethylene.

The conductive material used in both the plastic tubular member and the rubber tubular member of the present invention may be any of the conventional materials in the art, e.g., carbon, graphite, etc.

The tube connector insert 18 is manufactured from any suitable conductive material which would withstand the parameters to which it is subjected. Furthermore, the material, when formed into the insert, should have sufficient strength and a robust characteristic to withstand the clamping forces used to assemble the plastic tubing to the hose. In addition to the robust requirement, the insert should provide adequate pull-off force.

The tube connector insert 18 of the present invention should be of a size, i.e., length, body diameter and configuration which requires effort to implant the conductive connector insert 18 insert into the plastic tubular member 14 wherein the plastic tubular member 14 expands due to the pressure exerted by forcing the conductive connector insert 18 into the inside surface of the plastic tubular member 14 and the end of the tube relaxes to form a bead on the end of the tube which prevents the insert from becoming free. The length and diameter of the insert is not critical and is determined by the tube into which the insert is to be set. The circumference of the rib 44 on the shoulder portion 42 should be sufficient to allow the plastic tubular member 14 to form an adequate bead while reducing pull-off. In a preferred aspect of the invention, the conductive connector insert 18 is manufactured from a metal such as steel. However, it can be manufactured from any material such as a synthetic resin provided that the resin is made conductive and has sufficient strength to withstand the compression forces of the clamp.

A clamping means such as a worm screw clamp or a spring clamp 46 is included to prevent the rubber tubular member 16 from detaching from the conductive connector insert and the plastic tubular member 14. Typically, the clamping means is a ring-shaped clamp wherein the inner circumference of the clamp is uniformly reduced using a screw or spring device to provide pressure on the second tubular member to secure it to the first tubular member. The preferred clamps included common screw-actuated worm clamps or spring clamps which are readily available from any hardware store, plumbing supply store or automotive shop.

Although the invention has been described with respect to preferred embodiments thereof, it is to be understood that the invention is not limited to those embodiments, and that variations can be made therein without departing from the scope of the invention.

What is claimed is:

1. A conductive tubular connector insert configured to couple a first fuel-conveying tubular member having a conductive inner surface to a second fuel-conveying tubular member having a conductive inner surface in a fuel conveying system wherein conductive continuity is maintained between the conductive inner surface of the first fuel-conveying tubular member and the conductive inner surface of the second fuel-conveying tubular member, said conductive tubular connector insert comprising: a conductive tubular body member having a first tubular body section including a first distal end having a first annular margin, a second tubular body section including a second distal end having a second annular margin wherein said second tubular body section tapers inwardly adjacent said second end forming said second annular margin having a circumference smaller than the circumference of said first annular margin, and an annular rib extending outwardly from said conductive tubular body member in a radial direction intermediate said first distal and and said second distal end.

2. The connector insert of claim 1, wherein said first tubular body section extends axially from said annular rib in a first direction forming a first distal end having a first annular margin, and said second tubular body section extends axially from said annular rib in an opposite direction from said first tubular body section, forming a second distal end having a second annular margin.

3. The connector insert of claim 1, wherein said insert is manufactured from a conductive metal or a conductive synthetic polymer.

4. The connector insert of claim 3, wherein said insert is manufactured from a conductive metal.

5. The connector insert of claim 4, wherein said conductive metal is steel.

6. An automotive fuel system assembly comprising:
a first multilayer tubular member comprising a first conductive inner layer and a first outer layer, wherein said first multilayer tubular member exhibits fuel barrier characteristics;
a second multilayer tubular member comprising a second conductive inner layer and a second outer layer, wherein said second multilayer tubular member exhibits fuel barrier characteristics, and
a conductive tubular connector insert coupling said first multilayer tubular member to said second multilayer tubular member said conductive tubular connector insert comprising: a conductive tubular body member having a first tubular body section including a first distal end having a first annular margin, a second tubular body section including a second distal end having a second annular margin wherein said second tubular body section tapers inwardly adjacent said second end forming said second annular margin having a circumference smaller than the circumference of said first annular margin, and an annular rib extending outwardly from said conductive tubular body member in a radial direction intermediate said first distal end and said second distal end, wherein said first tubular body section extends axially from said annular rib in a first direction forming a first distal end having a first annular margin, and said second tubular body section extends axially from said annular rib in an opposite direction from said first tubular body section forming a second distal end having a second annular margin said conductive tubular connector insert residing in an end of said first multilayer tubular member such that the inner surface of said first multilayer tubular member is disposed on the outer surface of said first tubular body section and said end of said first multilayer tubular member forms a bead around said annular rib, and said second tubular body section resides in an end of said second multilayer tubular member such that said end of said second multilayer tubular member is disposed on the outer surface of said second tubular body section wherein said end of said second multilayer tubular member extends over the outer surface of the end of said first multilayer tubular member such that, conductive continuity is maintained between the inner surface of said first multilayer tubular member and the inner surface of said second multilayer tubular member.

7. The assembly of claim 6, wherein said second annular margin has a circumference smaller than the circumference of said first tubular body section.

8. The assembly of claim 6, wherein said first tubular body section has an outer circumference substantially equal to said inner circumference of said multilayer tubular member, and said second multilayer tubular member has an inner circumference equal to or greater than said outer circumference of said second tubular body section.

9. The assembly of claim 6, wherein said insert is manufactured from a conductive metal or a conductive synthetic polymer.

10. The assembly of claim 9, wherein said insert is manufactured from a conductive metal.

11. The assembly of claim 10, wherein said conductive metal is steel.

12. The assembly of claim 6 further including clamping means on the outer surface of said second multilayer tubular member, said clamping means being of an annular ring configuration wherein the circumference of said ring is uniformly reduced upon activation of said clamping means causing pressure to be exerted upon said second multilayer tubular member and said first multilayer tubular member to prevent pull-out of said first conductive tubular body section from said first multilayer tubular member and to prevent pull-out of said second conductive tubular body section from said second multilayer tubular member.

13. The assembly of claim 12, wherein said clamping means is a worm clamp or a spring clamp.

14. The assembly of claim 6, wherein said first multilayer tubular member comprises:
    a first conductive layer having an inner surface and an outer surface, wherein said first conductive layer is a molded or extruded plastic material selected from the group consisting of nitrile polymers, polyolefins, polyesters, polyamides, polyimides, polysulfones, polycarbonates, fluoro polymers, silicone polymers, polyurethanes, polyalkyleneterephthalates and mixtures thereof, and
    a first barrier layer having an inner surface and an outer surface, wherein the inner surface of said first barrier layer is adjacent the outer surface of said first conductive layer wherein said first barrier layer is a fluoro polymer selected from the group consisting of copolymers and terpolymers of tetrafluoroethylene, hexafluoropropylene and vinylidene fluoride, and mixtures thereof, or a metallic barrier layer selected from the group consisting of aluminum, cooper, brass and steel.

15. The assembly of claim 14, wherein said first multilayer tubular member further comprises:
    a cover layer selected from the group consisting of styrene-butadiene rubber, nitrile-butadiene rubber, chloroprene rubber, chlorinated polyethylene, chlorosulfonated polyethylene, epichlorohydrin ethylene oxide, polyvinyl chloride, and blends thereof.

16. The assembly of claim 15, wherein said first multilayer tubular member further comprises a reinforcing material disposed between said first tubular layer and said second tubular layer, or between said second tubular layer and said cover layer, said reinforcing material being selected from the group consisting of glass fibers, carbon fibers, boron fibers, silicon carbide fibers and organic fibers.

17. The assembly of claim 6 wherein said second multilayer tubular member comprises:
    a second conductive layer having an inner surface and an outer surface wherein said first conductive layer is a rubber material selected from the group consisting of natural rubbers, synthetic rubbers, halogenated polymers, copolymers of olefins with diene rubber, copolymers of olefins with non-conjugated dienes, and blends thereof; and
    a second barrier layer having an inner surface and an outer surface, wherein the inner surface of said second barrier layer is adjacent the outer surface of said second conductive layer wherein said second tubular layer is a fluoro polymer selected from the group consisting of copolymers and terpolymers of tetrafluoroethylene, hexafluoropropylene and vinylidene fluoride, and mixtures thereof, or a metallic barrier layer selected from the group consisting of aluminum, cooper, brass and steel.

18. The assembly of claim 17, wherein said second multilayer tubular member further comprises:
    a cover layer selected from the group consisting of styrene-butadiene rubber, nitrile-butadiene rubber, chloroprene rubber, chlorinated polyethylene, chlorosulfonated polyethylene, epichlorohydrin ethylene oxide, polyvinyl chloride, and blends thereof.

19. The assembly of claim 18 wherein said second multilayer tubular member further comprises a reinforcing material disposed between said first tubular layer and said second tubular layer, or between said second tubular layer and said cover layer wherein said reinforcing material is selected from the group consisting of glass fibers, carbon fibers, boron fibers, silicon carbide fibers and organic fibers.

20. A method for connecting a first multilayer tubular member having a first conductive inner surface to a second multilayer tubular member having a second conductive inner surface in an automotive fuel transport system assembly, such that electrical conductive continuity is maintained between said first multilayer tubular member and said second multilayer tubular member, said method comprising:
    providing a first multilayer tubular member having a first conductive inner layer and a first outer layer;
    providing a conductive tubular connector insert, said conductive tubular connector insert comprising:
        a first tubular body section having a first distal end including a first annular margin;
        a second tubular body section having a second distal end including a second annular margin, wherein said second tubular body section tapers inwardly adjacent said second end forming said second annular margin, said second annular margin having a circumference smaller than the circumference of said first annular margin; and
        an annular rib extending outwardly from said conductive tubular body member in a radial direction intermediate said first distal end and said second distal end, wherein said first tubular body section extends axially from said annular rib in a first direction forming a first distal end having a first annular margin, and said second tubular body section extends axially from said annular rib in an opposite direction from said first tubular body section forming a second distal end having a second annular margin, said conductive tubular connector insert residing in an end of said first multilayer tubular member such that the inner surface of said first multilayer tubular member is disposed on the outer surface of said first tubular body section and said end of said first multilayer tubular member forms a bead around said annular rib;
    implanting said first tubular body section of said conductive tubular connector insert into an open end of said first tubular member such that the end of said first polymeric tubular member forms a bead around said annular rib to secure said conductive connector insert therein, said second tubular body section extending outward from the end of said first polymeric tubular member;
    providing a second multilayer tubular member having a second conductive inner surface, and a second outer surface, said second multilayer tubular structure having an inner circumference equal to or greater than the outer circumference of the second annular margin of said second conductive tubular section;
    implanting said second distal end of said conductive tubular connector insert into an open end of said second tubular member such that said second polymeric tubular member overlaps the end of said first polymeric tubular member; and
    securing said first polymeric tubular member and said second polymeric tubular member to said conductive tubular connector insert to form said assembly, the configuration of said assembly being such that conductive continuity is maintained between the conductive inner surface of said first polymeric tubular member, the conductive tubular connector insert, and the second multilayer tubular member.

21. The method of claim 20 wherein said securing step comprises second polymeric tubular member is secured to said first polymeric tubular structure by clamping means onto the outer surface of said second polymeric tubular structure, said clamping means being of an annular ring configuration wherein the circumference of said ring is uniformly reduced upon actuation of said clamping means causing pressure to the exerted upon said second polymeric tubular structure to prevent pull-out of said first polymeric tubular structure from second polymeric tubular structure.

22. The method of claim 21 wherein said actuation of said clamping means is caused by actuating a screw or a spring.

23. The method of claim 22, wherein said clamping means is a worm clamp or a spring clamp.

24. The method of claim 20, wherein said first multilayer tubular member comprises:
   a first conductive layer having an inner surface and an outer surface, wherein said first conductive layer is a molded or extruded plastic material selected from the group consisting of nitrile polymers, polyolefins, polyesters, polyamides, polyimides, polysulfones, polycarbonates, fluoro polymers, silicone polymers, polyurethanes, polyalkyleneterephthalates and mixtures thereof; and
   a first barrier layer having an inner surface and an outer surface, wherein said first barrier layer is adjacent the outer surface of said first conductive layer wherein said first barrier layer is a fluoro polymer selected from the group consisting of copolymers and terpolymers of tetrafluoroethylene, hexafluoropropylene and vinylidene fluoride, and mixtures thereof, or a metallic barrier layer selected from the group consisting of aluminum, cooper, brass and steel, wherein said second tubular layer exhibits barrier properties.

25. The method of claim 20, wherein said first tubular member further comprises:
   a cover layer selected from the group consisting of styrene-butadiene rubber, nitrile-butadiene rubber, chloroprene rubber, chlorinated polyethylene, chlorosulfonated polyethylene, epichlorohydrin ethylene oxide, polyvinyl chloride, and blends thereof.

26. The method of claim 25 wherein said first multilayer tubular member comprises a reinforcing material disposed between said first tubular layer and said second tubular layer, or between said second tubular layer and said cover layer wherein said reinforcing material is selected from the group consisting of glass fibers, carbon fibers, boron fibers, silicon carbide fibers and organic fibers.

27. The method of claim 20, wherein said second multilayer tubular member comprises:
   a second conductive layer having an inner surface and an outer surface wherein said second conductive layer is a rubber material selected from the group consisting of natural rubbers, synthetic rubbers, halogenated polymers, copolymers of olefins with diene rubber, copolymers of olefins with non-conjugated dienes, and blends thereof; and
   a second barrier layer having an inner surface and an outer surface, wherein the inner surface of said second conductive inner layer is adjacent the outer surface of said second conductive layer wherein said second tubular layer is a fluoro polymer selected from the group consisting of copolymers and terpolymers of tetrafluoroethylene, hexafluoropropylene and vinylidene fluoride, and mixtures thereof, or a metallic barrier layer selected from the group consisting of aluminum, copper, brass and steel.

28. The method of claim 20, wherein said second multilayer tubular member further comprises:
   a cover layer selected from the group consisting of styrene-butadiene rubber, nitrile-butadiene rubber, chloroprene rubber, chlorinated polyethylene, chlorosulfonated polyethylene, epichlorohydrin ethylene oxide, polyvinyl chloride, and blends thereof.

29. The method of claim 28, wherein said second multilayer tubular member further comprises a reinforcing material selected from the group consisting of glass fibers, carbon fibers, boron fibers, silicon carbide fibers and organic fibers.

* * * * *